3,179,662
PURIFICATION OF CYANURIC CHLORIDE
Christoph Zinsstag, Visp, Robert Bach, Basel, and Raymond Perren, Binningen, Switzerland, assignors to Lonza Ltd., Basel, Switzerland
Filed Feb. 1, 1961, Ser. No. 86,493
Claims priority, application Switzerland, Feb. 2, 1960, 1,206/60; Oct. 13, 1960, 11,477/60
8 Claims. (Cl. 260—248)

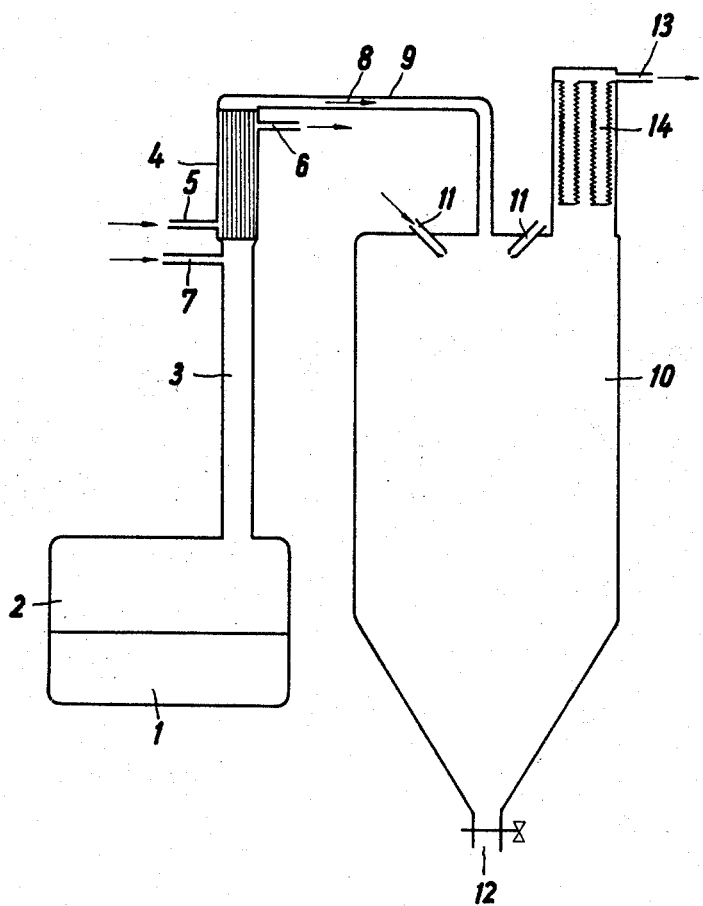

The invention relates to the purification of cyanuric chloride.

It has already been proposed to obtain cyanuric chloride by simple vaporization and condensation. However, the thus produced cyanuric chloride is not sufficiently pure for many applications, and for the preparation of a purer product additional manipulations are required, for instance, repeated distillation, recrystallization from solvents, and the like. Such operations not only reduce the yield but are also uneconomic. In addition, many of the known procedures have the disadvantage that the solid cyanuric chloride is not directly obtained in the form of a powder but the condensed melts form blocks or scales which have to be ground. In purification by recrystallization, the crystals have to be completely freed from the solvent.

It is a principal object of the invention to provide a single vaporization and condensation procedure avoiding the recited drawbacks.

It is another object of the invention to provide a method of obtaining the condensed cyanuric chloride of high purity directly in finely powdery form, e.g. of a grain size of about 2 to 50$\mu$, which is of particular advantage for the further processing of cyanuric chloride.

Other objects and advantages will be apparent from a consideration of the specification and claims.

In accordance with the invention, molten cyanuric chloride is subjected to a fractionated distillation; the fractionated product is withdrawn from the head of the fractionation column by means of a carrier gas, passed into a separating device and cooled therein by means of an inert cooling medium, which may be a gas, to a temperature below the melting point, thereby condensing the cyanuric chloride as a powder.

In carrying out the invention, the cyanuric chloride to be purified is molten, heated to boiling temperature, rectified in a fractionation column, withdrawn as vapor from the head of the fractionation column by means of a carrier gas introduced into said head, and passed into a condensation device. Preferably, the cyanuric chloride vapor and the preheated carrier gas are passed through a cooling device, e.g. a dephlegmator provided at the head of the column.

An apparatus suitable for carrying out the method of the invention is shown diagrammatically in the accompanying drawing.

The apparatus comprises a vessel 2 for heating cyanuric chloride 1. The numeral 3 designates a fractionation column provided with a dephlegmator 4 producing the reflux; the dephlegmator is provided with an inlet 5 and an outlet 6 for passage of the cooling medium.

Line 7 serves to introduce a carrier gas. The mixture 8 of carrier gas and cyanuric chloride vapor passes through line 9 into wide condensing chamber 10 provided with an outlet 12 for withdrawing the precipitated cyanuric chloride. The gas passes through a dust filter 14 into the outlet 13. The reference numerals 11 designate inlets for a cooling gas or spray.

As shown in the drawing, the carrier gas is preferably introduced into the column at a point immediately below the cooling device in order to use fully the separating effect of the column. The cooling medium for the dephlegmator is maintained at a temperature in the range of about 145 to 185° C. Under these conditions, carrier gas saturated with cyanuric chloride passes over at a temperature in the range of about 10 to 40° C. below the boiling temperature of the cyanuric chloride (195° C.). Said mixture is then passed into the condensing device. In this way, an additional purification is accomplished by the pseudo-sublimation taking place in the dephlegmator. An additional advantage is that undesirable precipitation during the travel to the condenser, due to supersaturation, is avoided.

As carrier gas, we may use any gas which is inert with respect to cyanuric chloride, for instance nitrogen, carbon dioxide, or noble gases. The carrier gas must be, of course, substantially free of water vapor.

As a further advantage of the use of a carrier gas, the cyanuric chloride vapors enter the condenser in diluted form; only in this way it becomes possible to obtain a very fine powder of cyanuric chloride. For this purpose, it is of advantage to cool the carrier gas-cyanuric chloride mixture leaving the head of the column quickly by means of an inert cooling gas to a temperature below the solidification point of the pure cyanuric chloride (146° C.), preferably to a temperature which is about 80 to 140° C. lower than said solidification temperature. The carrier gas-vapor mixture passes then into the condenser in which is broken up and quenched by a turbulent cold inert gas so that the cyanuric chloride is precipitated in the form of a very fine powder. It is of advantage to direct streams of cooling gas from a plurality of cooperating nozzles in such a way on the carrier gas-vapor mixture that a vortex is formed in which the mixture is quenched. However, the admixture of the cooling gas to the carrier gas-vapor mixture may also be carried out in other ways and by other means.

By adjusting the amount and temperature of the inert cooling gas, we can control the grain size of the obtained pure cyanuric chloride within a wide range. With increasing intensity of the cooling, the grain size decreases.

If the same gas is used as carrier gas and cooling gas it may be re-used without removal of residual cyanuric chloride.

Instead of a cooling gas, an atomized liquid may be used to condense the cyanuric chloride. In this way, it is possible to produce condensates of particularly fine grain size.

In order to produce a good mixture between the mixture of carrier gas and cyanuric chloride vapor on the one hand and atomized liquid on the other hand, we subject both components to a common turbulent motion, for instance by means of a turbulent gas stream. The liquid is injected through additional nozzles of very small surface into the stream of the turbulent gas radially at the side walls or from above into the condenser. The introduction of the readily vaporized liquid for forming an aerosol takes place at a temperature below the critical temperature and at a pressure below the critical point of said liquid. The vaporized liquid may be recovered by suitable means, for instance by compression. Suitable for this purpose are all non-hygroscopic liquids, or gases which are inert with respect to cyanuric chloride and preferably boil below +20° C., if necessary under pressure. Examples are low boiling hydrocarbons such as methane, ethane, propane, and butane, halogenated hydrocarbons such as difluodichloromethane and the like, methyl chloride, also dimethyl ether, nitrogen, hydrogen, oxygen, noble gases, and others. We prefer to use liquid carbon dioxide. By injecting said readily volatilized liquids and adjusting their proportion in relation to the mixture of carrier gas and cyanuric chloride vapor, it is possible to produce in the condenser any desired low temperature down to the boiling point of the cooling agent and thereby to obtain a condensate of any desired fine grain size. The amount and temperature of the liquid should be so controlled as not to leave any liquid phase at the end of the operation. If there is an excess of liquid, the cyanuric chloride must, of course, be freed from the cooling liquid.

A further advantage of the use of readily vaporized liquids as quenching agent consists in preventing substantially any deposists at the walls of the condenser and the formation of so-called "spray grains." Also the amount of waste gases is smaller, and their temperature is lower.

The finest end products are of particular value as they open up the application of cyanuric chloride for suspension reactions. At 60° C., the average grain size is about 30μ, at 20° C. about 5μ and at 0° C. about 2μ.

The following examples are given to illustrate how the invention may be carried out in the apparatus shown.

*Example 1*

Cyanuric chloride 1 is heated in the vessel 2 to boiling temperature. The vapors are fractionated in the column 3, whereby the higher boiling impurities, particularly an oil having a boiling point of about 250° C., are completely retained. The reflux of pure cyanuric chloride is effected by the dephlegmator 4, the cooling medium of which is maintained at a temperature between the melting point and the boiling point of cyanuric chloride, preferably at 150 to 160° C. As cooling medium, we may use water under pressure.

Nitrogen is introduced at 7 as carrier gas for the removal of the cyanuric chloride vapors, and is saturated with said vapors in the dephlegmator. The temperature of the mixture of carrier gas and cyanuric chloride vapor can be controlled by the distillation rate and the cooling at the dephlegmator. Said mixture 8 is passed through line 9 into the wide chamber 10, in which it is cooled by cold nitrogen introduced at 11. In order to obtain quickly a temperature far below the solidification temperature of the pure cyanuric chloride, the mixture of carrier gas and cyanuric chloride vapor is torn by means of cold nitrogen streams ejected from a ring of injection nozzles (not shown).

The cyanuric chloride is precipitated in form of fine crystals, which are collected at the bottom of the chamber and withdrawn through gate 12. The gas leaving the chamber at 13 is purified by the dust filter 14.

*Example 2*

About 50 m.³ of nitrogen, which has been compressed to 3 atm. and precooled to about −10° C., were injected through 11 into the chamber 10 of the apparatus described in Example 1 and shown in the drawing.

Into the vortex of said cold nitrogen gas, there was introduced a current of about 3 m.³/h. of nitrogen carrying 30 kg./h. of cyanuric chloride and having a temperature of 180° C. The temperature in the chamber 10 adjusted itself to 60° C., and the precipitated cyanuric chloride had a grain size of 30 to 50μ. The gas leaving the chamber at 13 contained still 600 g./h. of cyanuric chloride.

*Example 3*

A vortex was produced in chamber 10 by introducing 20 m.³/h. of nitrogen. Liquid carbon dioxide of a pressure of about 50 atm. was injected into said vortex at room temperature by means of a nozzle (not shown). The amount of injected carbon dioxide was so adjusted that, on introducing the carrier gas and cyanuric chloride vapor, the temperature in the chamber was about 20° C. This required about 30 kg./h. of $CO_2$. The precipitated cyanuric chloride had an average grain size of 5μ. Considerably larger particles, so-called "spray grains," were practically absent. The exhaust gas contained only about 7 g./h. of cyanuric chloride.

*Example 4*

Liquid carbon dioxide was injected at room temperature by a nozzle into chamber 10, and the carbon dioxide jet was directed straight onto the mixture of carrier gas and cyanuric chloride vapor, which had a temperature of about 180° C. The proportions of the hot gas stream and the liquid carbon dioxide were adjusted to produce a mixing temperature of 20° C., which required about 35 kg./h. of $CO_2$.

The precipitated product had a particle size of about 5 to 10μ.

The higher boiling impurities, in particular the oil having a boiling point of about 250° C. referred to in the above examples, appear to be a polymer of CNCl. The presence of this particular impurity is highly undesirable in purified cyanuric chloride since it is much easier to saponify the polymer than the cyanuric chloride, thereby producing HCl, which in turn acts as catalyst by increasing greatly the saponification speed of cyanuric chloride.

We claim:

1. A method for the purification of cyanuric chloride comprising melting cyanuric chloride, subjecting the developed vapors to rectification in a distillation zone, providing sequentially behind said distillation zone a cooling zone and a condensing zone, introducing an inert carrier gas into said cooling zone to remove the rectified cyanuric chloride from said distillation zone, passing the mixture of said carrier gas and cyanuric chloride vapor into said condensing zone, and cooling said mixture in said zone by means of an inert cooling medium to a temperature below the melting point of the cyanuric chloride, thereby obtaining powdery cyanuric chloride.

2. The method as claimed in claim 1 comprising passing said mixture of carrier gas and cyanuric chloride vapor at a temperature of about 10 to 40° C. below the boiling point of the cyanuric chloride into said condensation zone.

3. The method as claimed in claim 1 comprising quenching said mixture of carrier gas and cyanuric chloride in said condensation zone to a temperature of about 80 to 140° C. below the solidification temperature of pure cyanuric chloride.

4. The method claimed in claim 1 wherein said inert cooling medium is a gas.

5. The method claimed in claim 1 wherein said inert cooling medium is an atomized liquid.

6. The method claimed in claim 5 wherein said inert cooling medium is atomized liquid carbon dioxide.

7. The method claimed in claim 5 comprising subjecting the mixture of carrier gas and cyanuric chloride vapor to a turbulent motion by means of a turbulent gas stream injected prior to the admixture of said atomized liquid.

8. The method claimed in claim 5 comprising subjecting the mixture of carrier gas and cyanuric chloride vapor to a turbulent motion by means of a turbulent gas stream injected simultaneously with the admixture of said atomized liquid.

References Cited in the file of this patent

UNITED STATES PATENTS

| | | |
|---|---|---|
| 3,000,887 | Rigby | Sept. 19, 1961 |

FOREIGN PATENTS

| | | |
|---|---|---|
| 1,071,709 | Germany | Dec. 24, 1959 |
| 842,781 | Great Britain | July 27, 1960 |

OTHER REFERENCES

Bowman et al.: Technique of Organic Chemistry, volume IV, Distillation, page 479 (1951).